United States Patent
Satoh et al.

(10) Patent No.: US 6,535,812 B2
(45) Date of Patent: Mar. 18, 2003

(54) MAP DISPLAY APPARATUS AND DISPLAY METHOD THEREFOR

(75) Inventors: Hiroyuki Satoh, Hachioji (JP); Kiyozumi Fujiwara, Yokohama (JP)

(73) Assignee: Alpine Electronics, Inc., Tokyo (JP)

( * ) Notice: Subject to any disclaimer, the term of this patent is extended or adjusted under 35 U.S.C. 154(b) by 0 days.

(21) Appl. No.: 09/955,748

(22) Filed: Sep. 19, 2001

(65) Prior Publication Data

US 2002/0123841 A1 Sep. 5, 2002

(30) Foreign Application Priority Data

Sep. 19, 2000 (JP) ........................................ 2000-283308
Nov. 8, 2000 (JP) ........................................ 2000-340500

(51) Int. Cl.[7] ............................................. G01C 21/30
(52) U.S. Cl. ........................ 701/208; 701/212; 340/990
(58) Field of Search ................................. 701/201, 208, 701/211, 212; 340/990, 995; 348/14.07, 42

(56) References Cited

U.S. PATENT DOCUMENTS 5,083,851 A  * 1/1992  MacDonald
5,908,465 A    6/1999  Ito et al.
6,201,544 B1   3/2001  Ezaki

* cited by examiner

*Primary Examiner*—Gertrude Arthur
(74) *Attorney, Agent, or Firm*—Brinks Hofer Gilson & Lione (57) ABSTRACT

In a stereoscopic map display method for an on-vehicle navigation apparatus, in displaying a town map, a threshold value is changed in accordance with the display scale; buildings taller than the threshold value are displayed stereoscopically; and buildings shorter than the threshold value are displayed monoscopically. Furthermore, of the buildings displayed stereoscopically, buildings as tall as or taller than a particular height are displayed as opaque images while the other buildings are displayed as transparent or semitransparent images. Furthermore, in displaying the buildings taller than the threshold value, shadows may be drawn as the buildings are projected.

20 Claims, 6 Drawing Sheets

| POLYGON TYPE | | |
|---|---|---|
| LINE COLOR | | |
| LINE TYPE | | |
| NUMBER OF NODES | | |
| PAINT COLOR | | |
| BUILDING NUMBER | | |
| NUMBER OF FLOORS | | |
| G1 | X1 | Y1 |
| G2 | X2 | Y2 |
| G3 | X3 | Y3 |
| G4 | X4 | Y4 |

PROPERTY DATA (rows 1–7)
COORDINATE DATA (rows G1–G4)

FIG. 7

MAP DISPLAY APPARATUS AND DISPLAY METHOD THEREFOR

BACKGROUND OF THE INVENTION

1. Field of the Invention

The present invention relates to a stereoscopic map display, and more specifically, the present invention relates to a stereoscopic map display apparatus and method for an on-vehicle navigation apparatus, for displaying a map on a display apparatus and thereby guiding the vehicle to a destination.

2. Description of the Related Art

An on-vehicle navigation apparatus includes a map data storage device, such as a DVD-ROM, on which map data is stored, a display apparatus, and a vehicle movement detection apparatus, such as a gyro, a GPS (Global Positioning System) receiver, and a speed sensor, for detecting the current position and the current direction of the vehicle. In the on-vehicle navigation system, map data relating to the current position of the vehicle is read from the map data storage device, a map image of the area surrounding the current position of the vehicle is drawn based on the map data with a vehicle position mark superimposed thereon, and the map image is scrolled in accordance with the movement of the vehicle or the vehicle position mark is moved while the map image is fixed on the screen, so that the current travel location of the vehicle can be recognized at a glance.

Furthermore, the on-vehicle navigation apparatus typically includes a navigation function which allows the user to readily travel to a desired destination without taking the wrong roads. The navigation function automatically searches for the route with the lowest cost from a starting point to a destination based on the map data by performing simulations according to the breadth-first search method, Dijkstra method, etc., and stores the route as a navigation route. In operation, for example, the navigation route is displayed in a different color and in a thicker line compared with other roads on the map image, and when the vehicle comes within a predetermined distance of an intersection at which the vehicle must change its direction on the navigation route, an arrow indicating the new direction is drawn at the intersection on the map image, thereby guiding the user to the destination.

The cost refers to a value indicating the suitability as the navigation route, for example, the distance multiplied by constants in accordance with the road width, road type (ordinary road or highway, etc.), number of right turns and left turns, the predicted travel time of the vehicle, etc. The cost may differ for two different routes with the same distance if the user specifies, for example, whether or not to use toll roads, giving priority to minimize distance or time, etc.

The maps stored in the map data storage apparatus, such as the DVD-ROM, are segmented by appropriate longitudinal intervals and latitudinal intervals in accordance with various scales, for example, $1/12{,}500$, $1/25{,}000$, $1/50{,}000$, and $1/100{,}000$, and roads, etc. are stored as groups of coordinate values of nodes represented by the longitude and latitude thereof. A road consists of the connection between two or more nodes, and a connection between two nodes is referred to as a link. The map data includes (1) a road layer including a road list, a node table, an intersection node list, etc; (2) a background layer for displaying roads, buildings, parks, rivers, etc. on the map image; and (3) a character and symbol layer for displaying text such as administrative district names such as municipal names, names of roads, names of intersections, names of buildings, map symbols, etc.

Recently, the DVD-ROM may store, in addition to the map data, what is called townpage information, i.e., information regarding shops, companies, public facilities, etc. (category, address, phone number, etc.). The townpage information readily allows the user to search for a desired shop, etc.

One map display method for an on-vehicle navigation apparatus is a 3-D display in which the map is displayed stereoscopically. In the 3-D display, buildings and roads are displayed stereoscopically as if the vehicle were actually traveling through a crowd of buildings.

According to the 3-D display in a conventional navigation apparatus, however, shorter buildings and roads are hidden behind taller buildings, causing the problem that buildings which serve as landmarks on the route cannot be readily recognized. Furthermore, in the conventional navigation apparatus, a distinction cannot be readily made on the map between buildings with townpage information associated therewith (hereinafter referred to as townpage buildings) and other buildings (hereinafter referred to as ordinary buildings).

BRIEF SUMMARY OF THE INVENTION

In view of the above, it is an object of the present invention to provide a stereoscopic map display method for an on-vehicle navigation apparatus, which improves visibility.

It is another object of the present invention to provide a stereoscopic map display method for an on-vehicle navigation apparatus, which readily allows distinguishing buildings with information such as townpage information associated therewith from other buildings.

To these ends, the present invention, in one aspect thereof, provides a map display method for displaying a map image on a display apparatus. The method includes the steps of changing a threshold value according to the display scale; stereoscopically displaying one or more buildings as tall as or taller than the threshold value; and monoscopically displaying one or more buildings shorter than the threshold value.

The threshold value may be increased as the contraction ratio of the map becomes larger.

The arrangement may be such that, of the one or more buildings as tall as or taller than the threshold value, only one or more buildings with particular information associated therewith are displayed stereoscopically.

The one or more buildings with particular information associated therewith may include buildings with townpage information associated therewith, including shops, companies, and/or public facilities.

Also, the arrangement may be such that, of the one or more buildings displayed stereoscopically, one or more buildings as tall as or taller than a first height are displayed as opaque images and the other buildings are displayed as transparent or semitransparent images.

Furthermore, the one or more buildings displayed semitransparently may be displayed so that roads and other buildings behind them can be recognized.

Also, one or more buildings as tall as or taller than a second height, greater than the first height, may be texture-mapped and displayed as opaque images.

The present invention, in another aspect thereof, provides a map display method for displaying a map image on a display apparatus. The method includes the acts of monoscopically displaying one or more buildings shorter than a specified threshold value; and stereoscopically displaying one or more buildings as tall as or taller than the threshold value and drawing shadows as the buildings are projected.

The arrangement may be such that, of the one or more buildings as tall as or taller than the threshold value, only buildings with particular information associated therewith are displayed stereoscopically and drawn with shadows.

Also, the one or more buildings with particular information associated therewith may include buildings with townpage information associated therewith, including shops, companies, and/or public facilities.

Furthermore, the positions of the shadows may be changed in accordance with the actual position of the sun.

The present invention, in still another aspect thereof, provides a map display apparatus. The map display apparatus includes a storage unit for storing information, including height information, regarding each of one or more buildings; a display unit, on which a map is displayed; an operation unit for selecting a display scale; and a control unit for determining the display mode of the one or more buildings in accordance with at least the height information of each of the one or more buildings and displaying a structure-shape map on the display unit. The control unit changes a threshold value in accordance with the display scale selected in the operation unit, displaying on the display unit one or more buildings as tall as or taller than the threshold value stereoscopically while displaying one or more buildings shorter than the threshold value monoscopically.

The control unit may determine the display mode based on information regarding the number of floors of the one or more buildings and a threshold value regarding the number of floors.

The arrangement may be such that the control unit stereoscopically displays, of the one or more buildings as tall as or taller than the threshold value, only one or more buildings with particular information associated therewith.

Also, the arrangement may be such that the control unit displays, of the one or more buildings displayed stereoscopically, buildings as tall as or taller than a first height as opaque images and the other buildings as transparent or semitransparent images.

Furthermore, the control unit may display roads and other buildings behind the one or more buildings displayed as semitransparent images so that the roads and other buildings can be recognized.

Also, the control unit may texture-map and display as opaque images one or more buildings as tall as or taller than a second height, greater than the first height.

The present invention, in yet another aspect thereof, provides a map display apparatus. The map display apparatus includes a storage unit for storing information, including height information, regarding each of one or more buildings; a display unit, on which a map is displayed; an operation unit for selecting a display scale; and a control unit for determining the display mode of the one or more buildings in accordance with at least the height information of each of the one or more buildings and displaying a structure-shape map on the display unit. The control unit changes a threshold value in accordance with the display scale selected in the operation unit, displaying on the display unit one or more buildings shorter than the threshold value monoscopically, while displaying one or more buildings as tall as or taller than the threshold value stereoscopically and drawing shadows as the buildings are projected.

The arrangement may be such that the control unit stereoscopically displays, of the one or more buildings as tall as or taller than the threshold value, only one or more buildings with particular information associated therewith, and draws shadows in association therewith. Also, the positions of the shadows may be changed in accordance with the actual position of the sun.

In accordance with the present invention, the number of buildings which are displayed stereoscopically can change in accordance with the display scale, maintaining visibility of the stereoscopic map. Furthermore, roads and buildings behind other buildings can be recognized, further improving the visibility of the stereoscopic map. Furthermore, a scene approximating the actual scene is produced on the map, facilitating recognition of the direction of the vehicle.

DETAILED DESCRIPTION OF THE INVENTION

Preferred embodiments of the present invention will be described below with reference to the accompanying drawings.

First Embodiment

Figure 1:
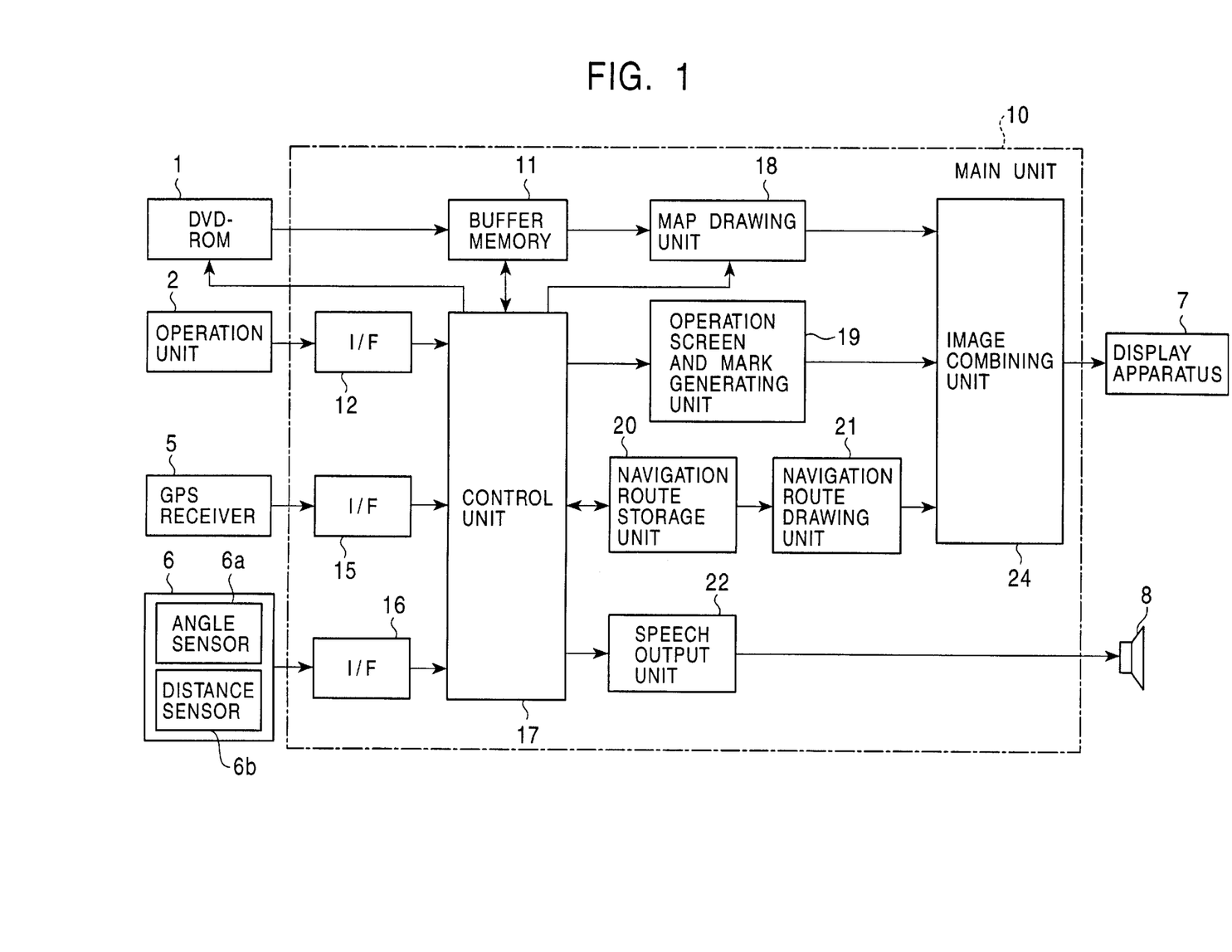
FIG. 1 is a block diagram showing the construction of an on-vehicle navigation apparatus for implementing a stereoscopic map display method according to an embodiment of the present invention.

FIG. 1 is a block diagram showing the construction of an on-vehicle navigation apparatus for implementing a stereoscopic map display method according to a first embodiment of the present invention.

Referring to FIG. 1, 1 indicates a DVD-ROM storing map data and townpage information, and 2 indicates an operation unit for operating a main unit 10 of the navigation apparatus to be described later. The operation unit 2 includes a joystick for moving a cursor, and operation buttons including an "OK" button. 5 indicates a GPS receiver which receives a GPS signal transmitted from a GPS satellite and which thereby detects the longitude and latitude of the current position of the vehicle. 6 indicates a self-contained navigation sensor, which includes an angle sensor 6a, such as a gyro, for detecting the rotation angle of the vehicle, and a traveled distance sensor 6b which generates a pulse each time the vehicle travels a predetermined distance. 7 indicates a liquid crystal display apparatus, on which the main unit 10 of the navigation apparatus displays a map of the area surrounding the current position of the vehicle, a navigation route from a starting point to a destination, a vehicle position mark, and other guidance information. 8 indicates a speaker for guiding the user by means of speech.

The components of the main unit 10 of the navigation apparatus will now be described. 11 indicates a buffer memory for temporarily storing map data read from the DVD-ROM 1. 12 indicates an interface connected to the operation unit 2, 15 indicates an interface connected to the GPS receiver 5, and 16 indicates an interface connected to the self-contained navigation sensor 6. 17 indicates a control unit implemented by a microcomputer. The control unit 17 executes various processes, such as detecting the current position of the vehicle based on information input from the interfaces 15 and 16, reading specific map data from the DVD-ROM 1 and storing it in the buffer memory 11, and searching for a navigation route from a starting point to a destination in accordance with conditions which are set using the map data stored in the buffer memory 11.

18 indicates a map drawing unit for generating a map image using the map data stored in the buffer memory 11. 19 indicates an operation screen and mark generating unit for generating various menu screens (operation screens) and various marks such as the vehicle position mark and the cursor in accordance with the operation status.

20 indicates a navigation route storage unit for storing the navigation route determined by the control unit 17, and 21 indicates a navigation route drawing unit for drawing the navigation route. The navigation route storage unit 20 records all the nodes on the navigation route determined by the control unit 17 from the starting point to the destination. The navigation route drawing unit 21 reads navigation route information (i.e., a node sequence) from the navigation route storage unit 20, and draws the navigation route in a different color and with a different line width from other roads.

22 indicates a speech output unit, which supplies a speech signal to the speaker 8 in accordance with a signal from the control unit 17.

24 indicates an image combining unit, which superimposes the various marks and operation screens generated by the operation screen and mark generating unit 19, the navigation route drawn by the navigation route drawing unit 21, etc. on the map image drawn by the map drawing unit 18 to display a combined image on the display apparatus 7.

In the navigation apparatus constructed as above, the control unit 17 detects the current position of the vehicle based on a GPS signal received by the GPS receiver 5 and a signal input from the self-contained navigation sensor 6. The control unit 17 then reads the map data of the area surrounding the current position of the vehicle from the DVD-ROM 1, and stores it in the buffer memory 11. The map drawing unit 18 generates a map image based on the map data stored in the buffer memory 11 and displays the map image of the area surrounding the current position of the vehicle on the display apparatus 7.

Furthermore, the control unit 17 detects the current position of the vehicle based on the signals received from the GPS receiver 5 and the self-contained navigation sensor 6 as the vehicle travels and in accordance with the result of detection, it superimposes the vehicle position mark on the map image displayed on the display apparatus 7, moving the vehicle position mark as the vehicle travels and scrolling the map image.

When the user sets a destination by operating the operation unit 2, the control unit 17, with the current position of the vehicle as a starting point, searches for the route with the lowest cost from the starting point to the destination using the map data stored on the DVD-ROM 1. Then, the control unit 17 stores the route, determined by the search, in the navigation route storage unit 20 as a navigation route, and superimposes the navigation route on the map image for display. The control unit 17 also provides guidance information as required as the vehicle travels, so that the vehicle can travel along the navigation route to the destination.

The on-vehicle navigation apparatus in this embodiment operates in the same manner as the conventional on-vehicle navigation apparatus, except for the operation of displaying a town map stereoscopically.

Figure 2A:
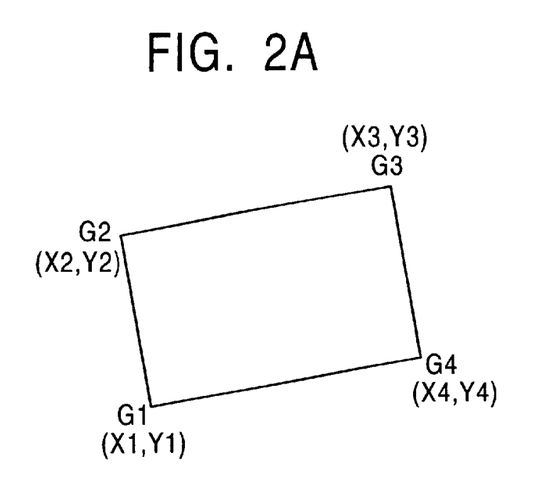
FIGS. 2A and 2B are diagrams showing the data structure of polygon data included in map data.
Figure 2B:
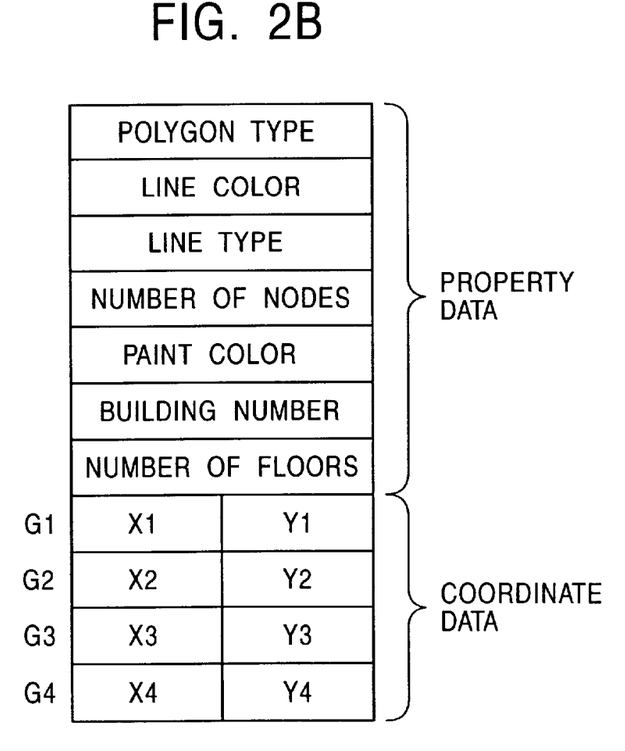

FIGS. 2A and 2B are diagrams showing the data structure of polygon data included in the map data. The figures show the data structure of polygon data used for drawing buildings on the map.

As shown in FIG. 2A, the polygon data for drawing buildings is represented as a group of nodes (G1 to G4 in this example). The polygon data for drawing buildings forms a closed shape with the end point (G4) connected to the start point (G1). The polygon data includes, as property data, the type of polygon, line (contour) color, line type (solid line, broken line, etc., line width, etc.), number of nodes, and paint color (color inside the polygon), and in the case of a townpage building, the polygon data further includes a building number unique to each building and information regarding the number of floors of the building. That is, the polygon data is linked to townpage information by the building number. The polygon data also includes the coordinate values of each of the nodes as coordinate data.

In this embodiment, when the town map is displayed stereoscopically, criteria regarding the height of the buildings to be displayed stereoscopically is changed in accordance with the display scale.

Figure 3:
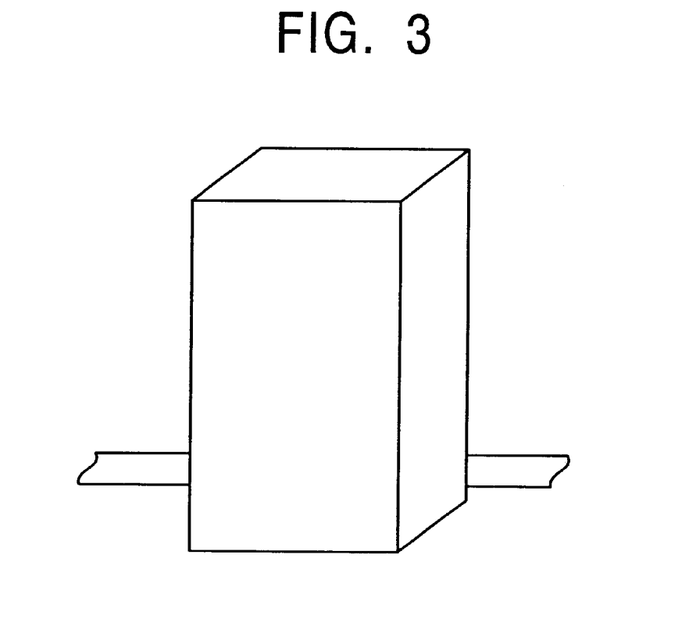
FIG. 3 is an illustration of a stereoscopic display of an opaque object.
Figure 4:
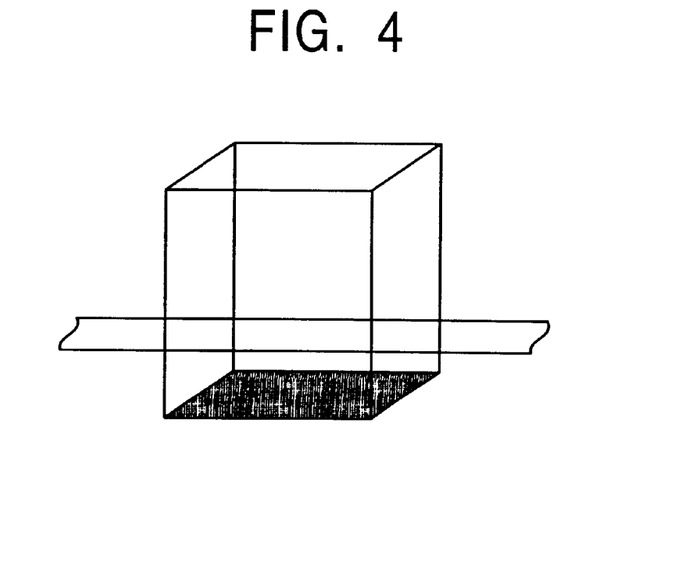
FIG. 4 is an illustration of a stereoscopic display of a transparent or semitransparent object.

For example, if the display scale is 10 to 25 m, the display area is relatively small, and therefore, visibility is not compromised even if relatively low buildings are displayed stereoscopically. Thus, in this embodiment, when the display scale is 10 to 25 m, buildings having four or more stories among townpage buildings are displayed stereoscopically while other buildings are displayed monoscopically. Furthermore, as shown in FIG. 3, townpage buildings having 20 or more stories and specific public facilities which serve as landmarks on the route are highlighted by texture-mapping in a predetermined color and displayed as opaque images. 10 to 19-story townpage buildings are displayed as transparent or semitransparent images as shown in FIG. 4, so that roads and buildings behind them can be recognized.

The specific public facilities to be displayed stereoscopically may include, for example, prefectural office buildings, municipal office buildings, ward office buildings, police stations, fire stations, and post offices. The public facilities are displayed, for example, in pale purple, and other buildings are displayed, for example, in pale blue, so that distinction can be made therebetween by color.

When the display scale is 50 to 100 m, the display area becomes larger, and therefore, visibility is diminished if relatively low buildings are displayed stereoscopically. Thus, in this embodiment, when the display scale is 50 to 100 m, townpage buildings having ten or more stories are displayed stereoscopically while other buildings are displayed monoscopically. Also in this case, townpage buildings having 20 or more stories and specific public facilities are displayed as painted in a predetermined color, and other townpage buildings are displayed as transparent or semitransparent images so that roads and buildings behind them can be recognized.

Figure 5:
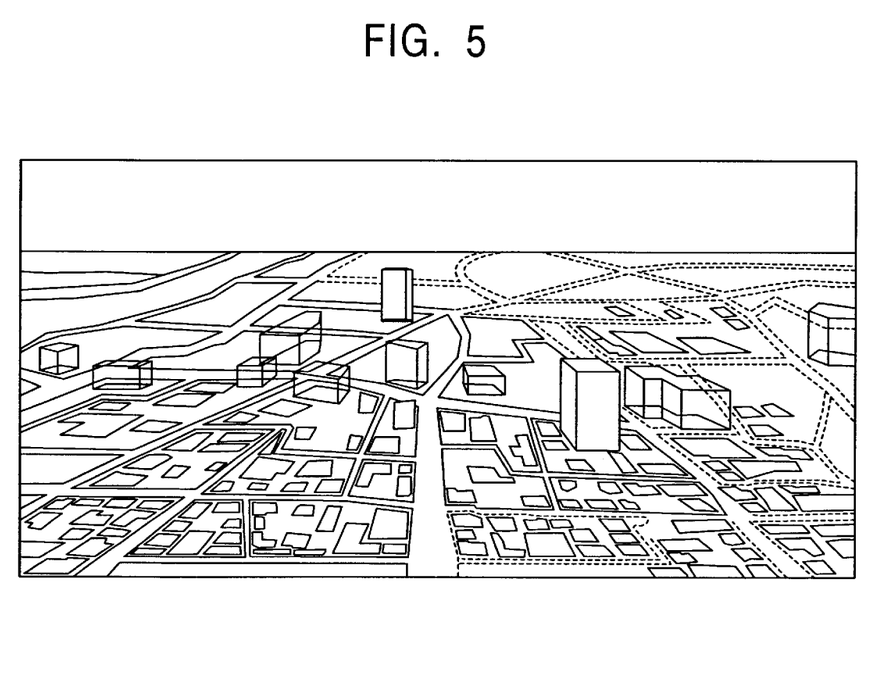
FIG. 5 is an illustration of an example of a stereoscopic map image in a first embodiment.

Table 1 below shows the criteria for buildings to be displayed stereoscopically when the display scale is 10 to 25 m and when the display scale is 50 to 100 m in this embodiment. Furthermore, FIG. 5 shows an example of a stereoscopic map image in this embodiment.

TABLE 1

| 10 to 25 m display scale | 50 to 100 m display scale |
| --- | --- |
| Townpage buildings having four or more stories are displayed stereoscopically, while other buildings are displayed monoscopically. Townpage buildings having 20 or more stories and public facilities are texture-mapped in a predetermined color, and other buildings are displayed semitransparently. | Townpage buildings having ten or more stories are displayed stereoscopically, while other buildings are displayed monoscopically. Townpage buildings having 20 or more stories and public facilities are texture-mapped in a predetermined color, and other buildings are displayed semitransparently. |

According to this embodiment, the criteria regarding the number of floors of buildings to be displayed stereoscopically is changed in accordance with the display scale. Furthermore, of the buildings which are displayed stereoscopically, tall buildings and public facilities which serve as landmarks on the route are displayed as opaque images while the other buildings are displayed as transparent or semitransparent images so as to allow recognition of roads and buildings behind them, improving visibility of the map. Accordingly, the usability of the 3-D map display in the on-vehicle navigation apparatus is improved.

In the above-described embodiment, in order to distinguish townpage buildings and ordinary buildings, only buildings with townpage information associated therewith are displayed stereoscopically. However, if there is no need to distinguish townpage buildings and ordinary buildings, whether to display a building stereoscopically or not may be determined based only on whether the height of the building exceeds a threshold value. Also in this case, visibility of the 3-D map display is improved.

Furthermore, although townpage buildings having 20 or more stories are displayed as opaque images both when the display scale is 10 to 25 m and when the display scale is 50 to 100 m in the above-described embodiment, the criteria regarding the height of buildings to be displayed as opaque images may be changed in accordance with the display scale.

Second Embodiment

A second embodiment of the present invention will be described below. This embodiment differs from the first embodiment in the method of displaying tall buildings. The construction of the navigation apparatus and the configuration of the map data are substantially the same as in the first embodiment, and the descriptions thereof will be omitted here.

In this embodiment, when a map is displayed on the display apparatus, buildings having nine stories or fewer are displayed monoscopically. Ordinary buildings having 3 or fewer stories are drawn in green, and 4 to 9 story townpage buildings are displayed in blue and the planar shapes thereof are drawn twice with a little deviation in position so as to add a stereoscopic effect, so that the two types can be readily distinguished.

Figure 6:
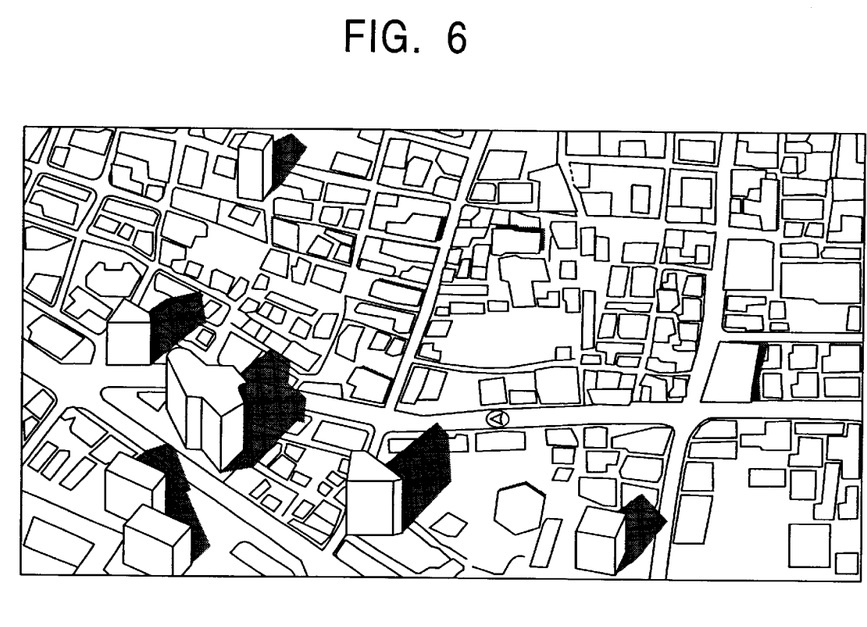
FIG. 6 is an illustration of an example of a stereoscopic map image in a second embodiment.
Figure 7:
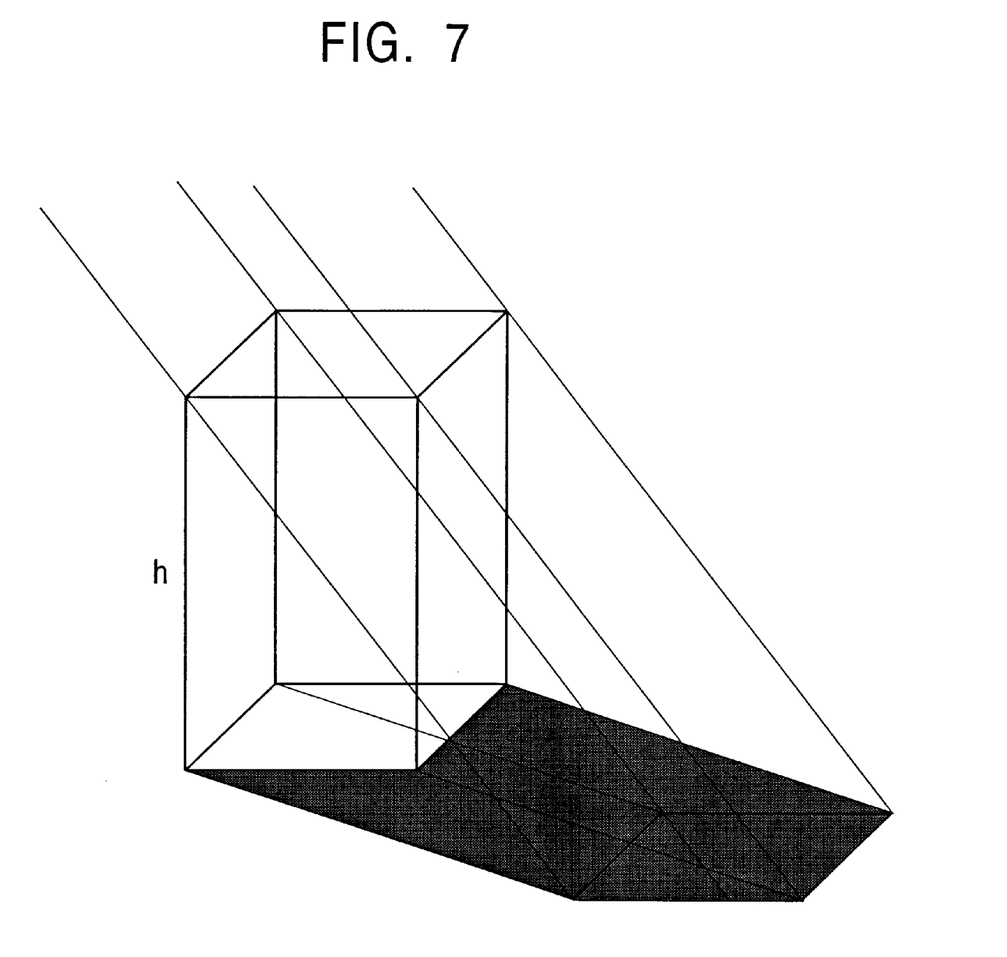
FIG. 7 is a schematic diagram showing a method of drawing a shadow.

With regard to a townpage building having 10 or more stories, as illustrated in the example of the stereoscopic map image shown in FIG. 6, a shadow is drawn as the building is projected. The shadow may be drawn, for example, as shown in FIG. 7, by presetting the position of a light source (the direction of irradiation of light), converting information regarding the number of floors included in the polygon data of the building to a height h, and calculating the positions of nodes of the shade. Then, the bottom surface of the building and the nodes of the shadow are connected to draw the shadow.

As described above, in this embodiment, when tall buildings having 10 or more stories and with townpage information associated therewith are displayed stereoscopically on the map, shadows are drawn as the buildings are projected. Accordingly, the height of the buildings which serve as landmarks on the route can be intuitively recognized.

Modification

In the second embodiment described above, shadows of buildings are drawn in relation to a light source fixed at a particular position. However, the position of the light source may be changed in accordance with the actual position of the sun. For example, the current position of the sun (the light source) may be determined based on position information and time information included in the GPS signal or the clock incorporated in the navigation apparatus, the shadows being drawn in accordance therewith as the buildings are projected. Accordingly, the shape and direction of the shadows of the tall buildings change in time, and the scene on the map better approximates the actual scene, thereby improving visibility. Furthermore, by comparing the direction of shadows on the map and the direction of actual shadows, the direction of the vehicle can be intuitively recognized.

In this case, the position of the sun at the current date and time, the sunrise time, and the sunset time may be obtained based on the time information included in the GPS signal or the calendar clock incorporated in the navigation apparatus, with the shadows of the buildings being drawn in accordance therewith. Accordingly, the length of shadows, etc. become even more similar to their counterparts in the actual scene, further facilitating the recognition of the direction of the vehicle.

What is claimed is:

1. A map display method for displaying a map image on a display apparatus, said method comprising:
   changing a threshold value according to a display scale;
   stereoscopically displaying one or more buildings as tall as or taller than said threshold value; and
   monoscopically displaying one or more buildings shorter than said threshold value.

2. A map display method according to claim 1, wherein said threshold value is increased as the display scale of the map becomes larger.

3. A map display method according to claim 1, wherein, of the one or more buildings as tall as or taller than said threshold value, only one or more buildings with particular information associated therewith are displayed stereoscopically.

4. A map display method according to claim 3, wherein the one or more buildings with particular information associated therewith comprise buildings with townpage information associated therewith, including shops, companies, or public facilities.

5. A map display method according to claim 1, wherein, of the one or more buildings displayed stereoscopically, one or more buildings as tall as or taller than a first height are displayed as opaque images and the other buildings are displayed as transparent or semitransparent images.

6. A map display method according to claim 5, wherein the one or more buildings displayed semitransparently are displayed so that roads and other buildings therebehind can be recognized.

7. A map display method according to claim 5, wherein one or more buildings as tall as or taller than a second height, higher than said first height, are texture-mapped and displayed as opaque images.

8. A map display method for displaying a map image on a display apparatus, said method comprising:

monoscopically displaying one or more buildings shorter than a specified threshold value; and stereoscopically displaying one or more buildings as tall as or taller than said threshold value and drawing shadows as the buildings are projected.

9. A map display method according to claim 8, wherein, of the one or more buildings as tall as or taller than said threshold value, only buildings with particular information associated therewith are displayed stereoscopically and shadows are drawn in association therewith.

10. A map display method according to claim 9, wherein the one or more buildings with particular information associated therewith comprise buildings with townpage information associated therewith, including shops, companies, or public facilities.

11. A map display method according to claim 8, wherein the positions of said shadows are changed in accordance with the actual position of the sun.

12. A map display apparatus comprising:

a storage unit for storing information, including height information, regarding one or more buildings;

a display unit, on which a map is displayed;

an operation unit for selecting a display scale; and a control unit for determining the display mode of the one or more buildings in accordance with at least the height information of each of the one or more buildings and displaying a structure-shape map on said display unit;

wherein said control unit changes a threshold value in accordance with the display scale selected in said operation unit, displaying on said display unit one or more buildings as tall as or taller than said threshold value stereoscopically while displaying one or more buildings shorter than said threshold value monoscopically.

13. A map display apparatus according to claim 12, wherein said control unit determines the display mode based on information regarding the number of floors of the one or more buildings and a threshold value regarding the number of floors.

14. A map display apparatus according to claim 12, wherein said control unit stereoscopically displays, of the one or more buildings as tall as or taller than said threshold value, only buildings with particular information associated therewith.

15. A map display apparatus according to claim 12, wherein, said control unit displays, of the one or more buildings displayed stereoscopically, buildings as tall as or taller than a first height as opaque images and the other buildings as transparent or semitransparent images.

16. A map display apparatus according to claim 15, wherein said control unit displays roads and other buildings behind the buildings displayed as semitransparent images so that the roads and other buildings can be recognized.

17. A map display apparatus according to claim 15, wherein said control unit texture-maps and displays as opaque images one or more buildings as tall as or taller than a second height, greater than said first height.

18. A map display apparatus comprising:

a storage unit for storing information, including height information, regarding one or more buildings;

a display unit, on which a map is displayed;

an operation unit for selecting a display scale; and a control unit for determining the display mode of the one or more buildings in accordance with at least the height information of each of the one or more buildings and displaying a structure-shape map on said display unit;

wherein said control unit changes a threshold value in accordance with the display scale selected in said operation unit, displaying on said display unit one or more buildings shorter than said threshold value monoscopically, while displaying one or more buildings as tall as or taller than said threshold value stereoscopically and drawing shadows as the buildings are projected.

19. A map display apparatus according to claim 18, wherein said control unit stereoscopically displays, of the one or more buildings as tall as or taller than said threshold value, only buildings with particular information associated therewith, and draws shadows in association therewith.

20. A map display apparatus according to claim 18, wherein the positions of said shadows are changed in accordance with the actual position of the sun.

* * * * *